US012093977B2

(12) United States Patent
Eich et al.

(10) Patent No.: US 12,093,977 B2
(45) Date of Patent: Sep. 17, 2024

(54) ATTENTION APPLICATION USER CLASSIFICATION PRIVACY

(71) Applicant: Brave Software, Inc., San Francisco, CA (US)

(72) Inventors: Brendan Eich, Santa Clara, CA (US); Luke Mulks, Dublin, CA (US); Benjamin Livshits, London (GB); Yan Zhu, San Francisco, CA (US); Mandar Shinde, Fremont, CA (US); Nejc Zdovc, Ljubečna (SI); Brian Johnson, Scottsdale, AZ (US)

(73) Assignee: Brave Software, Inc., San Francisco, CA (US)

( * ) Notice: Subject to any disclaimer, the term of this patent is extended or adjusted under 35 U.S.C. 154(b) by 0 days.

(21) Appl. No.: 18/091,680

(22) Filed: Dec. 30, 2022

(65) Prior Publication Data

US 2023/0134072 A1  May 4, 2023

Related U.S. Application Data

(62) Division of application No. 16/436,455, filed on Jun. 10, 2019, now Pat. No. 11,544,737.
(Continued)

(51) Int. Cl.
*G06Q 30/0242* (2023.01)
*G06F 3/01* (2006.01)
(Continued)

(52) U.S. Cl.
CPC ......... *G06Q 30/0246* (2013.01); *G06F 3/013* (2013.01); *G06Q 30/0242* (2013.01);
(Continued)

(58) Field of Classification Search
CPC ........... G06Q 30/0246; G06Q 30/0242; G06Q 30/0254; G06Q 30/0269; G06Q 30/0272;
(Continued)

(56) References Cited

U.S. PATENT DOCUMENTS 9,779,415 B2 * 10/2017 McElfresh ......... G06Q 30/0277
11,132,660 B2 * 9/2021 Sidhu ................ G06Q 20/223
(Continued)

*Primary Examiner* — David J Stoltenberg
*Assistant Examiner* — Kyle G Robinson
(74) *Attorney, Agent, or Firm* — Holland & Hart LLP

(57) ABSTRACT

Classification of the user of an attention application is moved from the cloud, where the classification is performed by advertisers based on trackers that follow a user, to the attention application itself. A user of the attention application controls inputs to the classification model and can exclude sensitive privacy information from inclusion in the classification model. The classification model is applied locally at the attention application to a catalog of advertisements and without revealing to trackers and advertisers whether attention was paid to particular ads. An analytics provider may have increased access to attention applications and can form ad campaigns and provide performance data thereon to advertisers without infringing attention user privacy. The system directs value away from trackers and advertisers and to attention application users and publishers.

4 Claims, 11 Drawing Sheets

Related U.S. Application Data

(60) Provisional application No. 62/683,001, filed on Jun. 10, 2018, provisional application No. 62/683,000, filed on Jun. 10, 2018.

(51) Int. Cl.
| | |
|---|---|
| *G06Q 30/0251* | (2023.01) |
| *G06Q 30/0272* | (2023.01) |
| *G06Q 30/0273* | (2023.01) |
| *H04L 67/02* | (2022.01) |
| *H04N 21/442* | (2011.01) |
| *H04N 21/45* | (2011.01) |
| *H04N 21/4784* | (2011.01) |

(52) U.S. Cl.
CPC ..... *G06Q 30/0254* (2013.01); *G06Q 30/0269* (2013.01); *G06Q 30/0272* (2013.01); *G06Q 30/0273* (2013.01); *H04N 21/44204* (2013.01); *H04N 21/4532* (2013.01); *H04N 21/4784* (2013.01); *H04L 67/02* (2013.01)

(58) Field of Classification Search
CPC ................ G06Q 30/0273; G06F 3/013; H04N 21/44204; H04N 21/4532; H04N 21/4784; H04N 21/812; H04L 67/02; H04L 67/535; H04L 67/306
See application file for complete search history.

(56) References Cited

U.S. PATENT DOCUMENTS

| | | | |
|---|---|---|---|
| 2008/0059293 A1* | 3/2008 | Hengel | G06Q 30/0249 705/14.71 |
| 2008/0169930 A1* | 7/2008 | Mallinson | G06Q 30/02 340/573.1 |
| 2009/0030778 A1* | 1/2009 | Zapata | G06F 21/6254 705/7.34 |
| 2010/0100440 A1* | 4/2010 | Nickelson, III | G06Q 30/02 707/E17.108 |
| 2014/0324577 A1* | 10/2014 | Kashyap | H04L 51/48 705/14.52 |
| 2018/0139043 A1* | 5/2018 | Jayachandran | H04L 9/3297 |

* cited by examiner

300

ATTENTION APPLICATION
USER CLASSIFICATION INPUT PREFERENCES

302 about:preferences#privacy

304
- ALLOW THESE CLASSIFICATION INPUTS:
  - [X] QUERY LOG [ENTER PRIVATE QUERY LOG TERMS:]
  - [ ] SITE VISIT HISTORY [ENTER PRIVATE SITES:]
  - [X] CONTENT SEARCHING
  - [X] USER ACTIVITY MODE
  - [X] PURCHASE HISTORY
  - [ ] DEMOGRAPHIC

306
- ADVERTISER SELECTION:
  - [X] SHOW ADS THAT PAY OVER [0.1] ATTENTION TOKENS

308
- SHARE CLASSIFICATION INPUTS WITH PUBLISHERS
  - content-publisher-1   X remove 310
- EXCLUDE ADS FROM THESE ADVERTISERS:
  - advertiser-1   X remove
  - advertiser-2   X remove
  - advertiser-3   X remove

FIG. 3

ATTENTION APPLICATION USER CLASSIFICATION PRIVACY

CROSS-REFERENCE TO RELATED APPLICATIONS

This application is a divisional of U.S. patent application Ser. No. 16/436,455 by EICH et al., entitled "ATTENTION APPLICATION USER CLASSIFICATION PRIVACY," filed Jun. 10, 2019, which claims priority benefit of U.S. Provisional Patent Application Nos. 62/683,000 and 62/683,001, entitled "Attention Metrics for Attention Applications" and "Attention Application User Classification Privacy," respectively, both filed Jun. 10, 2018; each of which is incorporated by reference herein.

BACKGROUND OF THE INVENTION

Attention applications present media content to a user. The media content may include forms such as text, websites, audio, video, etc., and the attention application may run on computer hardware such as a smartphone, tablet, gaming system, desktop computer, etc. When users consume media content on an attention application, especially when browsing the World Wide Web on a browser, parties other than the media content publisher intrude and collect surveillance on the user. Trackers, for example, may follow the user around the web and collect aspects of the user's browsing history and patterns that are unrelated to the media content being viewed or searched by the user. Media content publishers may decide to purchase user classification profiles from trackers to improve performance of their advertisements. This arrangement directs the majority of the revenue in the system to trackers and ad-tech entities, and away from content publishers and users. Privacy of the users is infringed by trackers and other techniques such as fingerprinting and intrusive (and sometimes abusive) advertisements degrade the user experience.

Accordingly, there is a need for user classification for advertisement matching that does not rely on third-party tracking a user across unrelated media publishers to profile the user's attention, browsing, and purchase histories in violation of the user's privacy.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a diagram of attention application privacy settings for user classification and ad matching.

Figure 1:
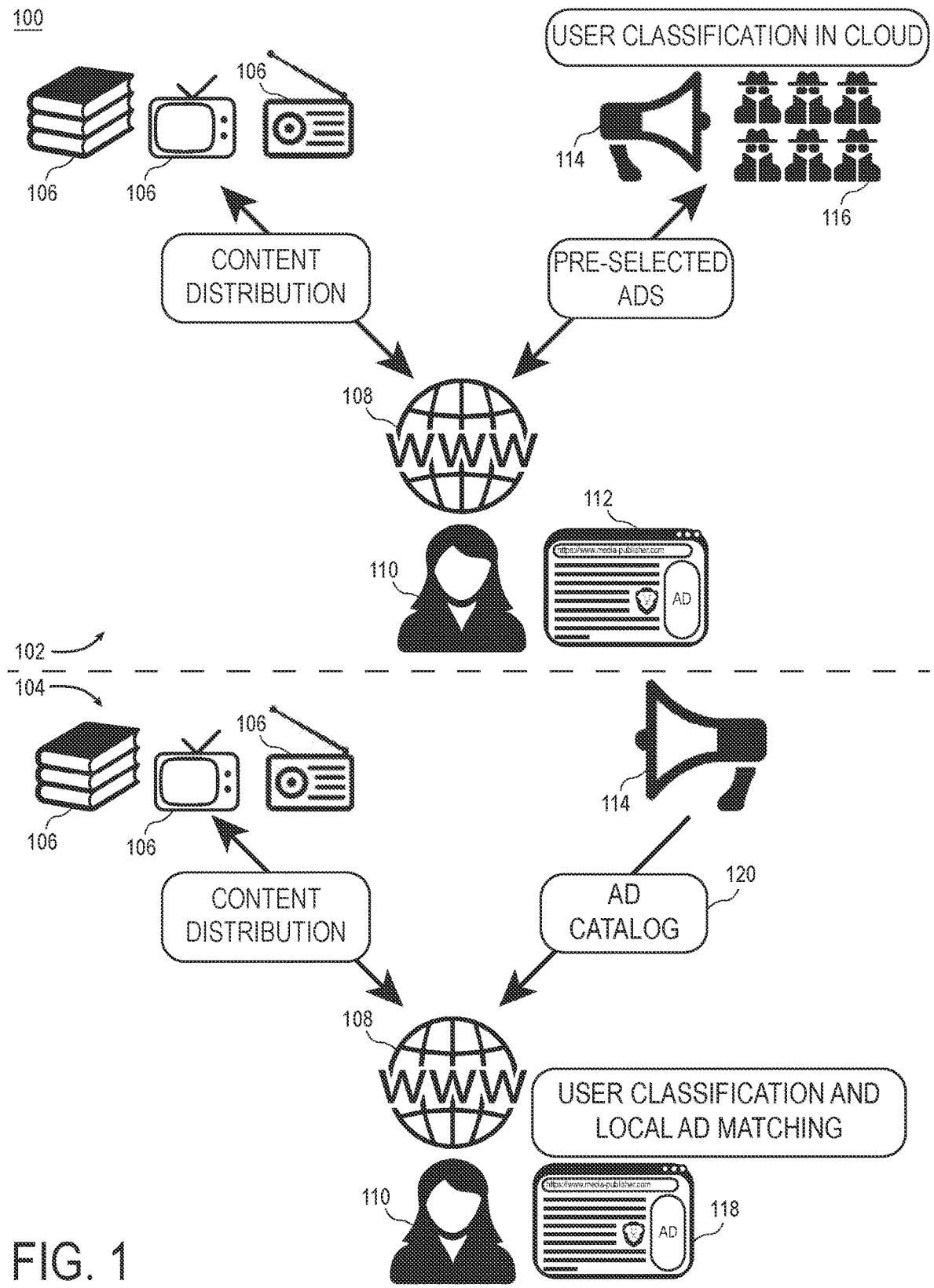
FIG. 1 is a split diagram of a user tracking arrangement with user classification in the cloud above the dashed line and a privacy classification arrangement with local attention application user classification against a pushed ad catalog below the dashed line.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Users of attention applications tend to leak private information as they consume media content. Of all attention applications, web browsing in particular exposes users to scrutiny from trackers who assemble and sell classification and interest profiles of users to advertisers and media publishers. Users are often not aware that trackers follow them all around the web, even on media publishing sites the users believe are unrelated to the trackers. Certain pieces of information that should be private to the user relating to sensitive information is exposed to anonymous stranger such as the query log, browsing history, sharing activity, purchase history, etc. Even when a user makes a direct request to a website without using a search engine, the DNS query can reveal the user's visit to the website without the user's permission. The user experience can take on a creepy feeling due to targeting ads but also delivers poorly targeted ads since not even the most ubiquitous trackers see all of a user's activity. Some websites, such as news sites, typically host dozens of trackers that slow page load times and devour the user's bandwidth, which can be particularly expensive on mobile networks.

FIG. 1 is a split diagram 100 of a user tracking arrangement with user classification in the cloud above the dashed line 102 and a privacy classification arrangement with local attention application user classification against a pushed ad catalog below the dashed line 104. Above the line 102, media content publishers 106 distribute media content via a network such as the World Wide Web 108 to a user 110 of an attention application 112. The attention application 112 includes any application that holds the user's attention including without limitation web browsers, e-readers, video, audio, gaming, online forum browsers, chat applications, video conferencing, social networks, microblogging apps, etc.

Embedded in the media content distributed by the media publishers 106 are links to ads and trackers monitored by advertiser 114 and a set of trackers 116. Often media content is associated with many trackers 116, all of whom are mining private information of the user 110 to assemble user classification profiles. The combination of ads and trackers infringes the privacy of the user 110, consumes an unreasonable portion of the user's bandwidth without delivering any value to the user, and can intrude on the user experience with abusive practices such as full-page ads, unwanted audio, deceptive click traps, and more.

Below the dashed line 104, media content publishers 106 distribute media content to the user 110 via the network 108, but the attention application 118 blocks requests to trackers and ads. Instead of performing user classification in the cloud, where it is outside the user's control, the attention application 118 determines classifications of the user locally and privately and does not leak the classification to other participants in the system.

In the system illustrated below the line 104, an advertiser does not classify the user 110 and serve a targeted ad. Instead, the advertiser 114 (also termed herein an "aggregator") assembles and distributes an ad catalog of many ads directed to users in many target markets. The advertiser 114 may transmit the ad catalog or ads therein (including just a single ad) to the users indirectly. An aggregator may receive and assemble ads from many advertisers and publish to the end users. The aggregator may provide additional services to the advertisers, such as analysis of ad campaigns, handling of digital asset rewards, market segment research, etc. The ads in the catalog may be associated with a taxonomy of market segment classifications. The attention application 118 selects ads from the catalog in accordance with its own classification model or via a model provided by another party, such as the advertiser.

Above the dashed line 102, trackers 116 sometimes invasively follow the user around the web, but often fail to detect substantial portions of the attention of the user 110. Even the most aggressive trackers likely do not detect all of the attention of the user 110. User classification in the cloud therefore is based on an incomplete viewpoint of the user's true interests and attention and may result in ad matching that is sub-optimal compared to an application of the classification model to all of the browsing and attention activity of the user 110. Below the dashed line 104, the attention application 118 has visibility into all media consuming activity of the user 110 on the attention application 118. In some implementations, the attention application 118 may share visibility of the user 110 with other attention applications.

The attention application 118 receives certain input signals from the user 110 in the course of consuming media content received from the publishers 106. Typically, a user 110 first finds media content to consume by visiting a website or looking at search results for a query term. Inputs used to find media content to consume are referred to as content selection inputs in this disclosure. From content selection inputs arise attention information such as query terms, site visitation history, etc. that may be used as inputs to a user classification model because they reveal interests and/or preferences of the user. Some types of site visits may include other information relating to a user's interests such as a purchase history at an e-commerce retailer. As used herein, attention information arising from user content selection inputs is termed classification inputs.

Another type of input signals from the user 110 to the attention application 118 are signals that control how media content is displayed to the user 110. For example, if reading a website, the attention application will receive signals that a user wishes to scroll down a page. If text appears on the page, the attention application 118 can calculate a scroll speed and/or estimate a reading speed of the user 110. Other types of signals that control how media content is displayed to the user 110 include next page links, sharing links, text highlighting, liking posts, replying to posts, fast forward/replay/skip audio and/or video. Signals from the user that control how media content is displayed at the attention application 118 are termed presentation inputs as used herein. Presentation inputs can be used to determine areas of user attention and/or interest and therefore may be used by the attention application 118 as inputs to the user classification model.

Figure 2:
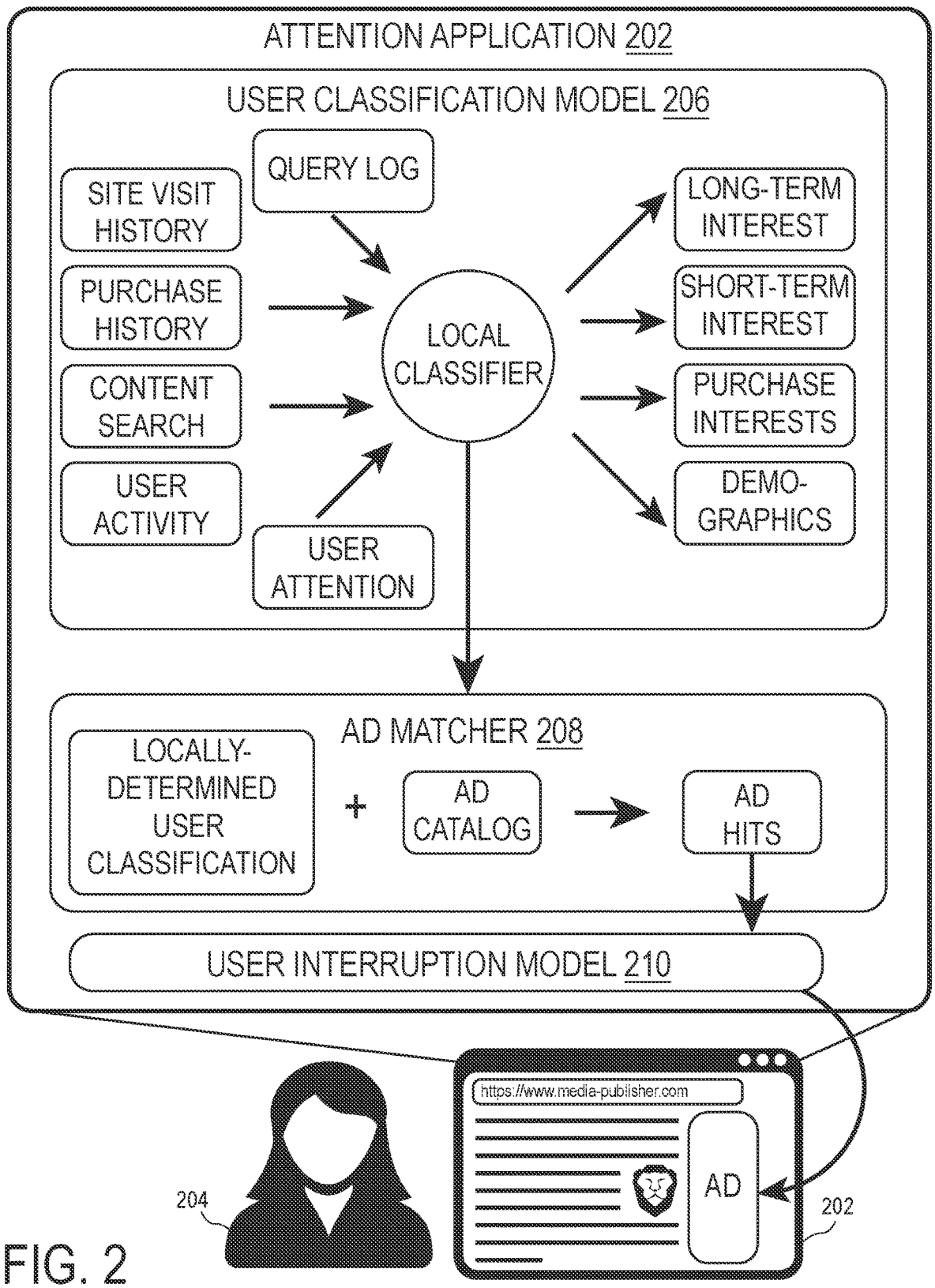
FIG. 2 is a diagram of a classification model and ad matcher running locally on an attention application.

FIG. 2 is a diagram 200 of a user classification model 206 and ad matcher 208 running locally on an attention application 202. A user 204 of the attention application 202 provides content selection inputs and content presentation inputs to the attention application 202 in the course of consuming media content on the attention application 202.

The user classification model 206 illustrates example classification model inputs, including classification model inputs that are based on content selection and content presentation signals from the user 204. Example content selection inputs are the query log and the site visit history. Illustrated in FIG. 2 is the example of a web browser, but the concepts of content selection inputs will apply to other types of attention applications as well (e.g., searching for and downloading books on an e-reader, searching for and selecting music tracks on a streaming service, searching for and selecting videos on a video site, etc.).

Media content presentation inputs supply another input to the user classification model 206 by revealing areas of media content that received user attention. Content presentation inputs such as scroll speed, reading speed, text likely read (e.g., as confirmed by time spent on screen, an eye tracking device, etc.), display time of images, portions of audio or video played, replayed, etc., reveal topics, content producers, themes, etc. of interest to the user 204.

Other types of inputs to the user classification model 206 are based on the content of media consumed by the user 204. The content may be searched (e.g., text search, reverse image search), visited websites may reveal a purchase history at an e-commerce retailer. In some implementations, media produced by the user may be searched such as when the user composes an email, blog post, online forum comment, etc. Keywords found in such a search may indicate areas on the taxonomy classification to which the user is more likely to pay attention.

Another type of input to the user classification model 206 is user activity. In particular if an attention application 202 is synchronized across multiple hardware devices, the attention application 202 may provide content to the user 204 in a variety of contexts. The user 204 may exhibit different types of attention in terms of time span, intensity, topic of interest depending on an activity in which the user 204 is engaged. For example, if the user 204 is reading news on a smartphone during a work commute, then the user 204 may be receptive to detailed text ads regarding recent search items. On the other hand, if the user 204 is running in a park and listening to audio on the smartphone, then the user 204 may be more likely to pay attention to an audio ad regarding a topic of long-term interest to the user. Other user activity scenarios may be discovered and input into the user classification model 206 by analysis of user patterns by the attention application 202 in combination with information suggesting type of user activity (e.g., GPS movement data, time of day, type of media content, etc.).

The user classification model 206 produces several classification outputs. One type of classification model 206 output is long-term user interests. Long-term user interests may be found in the history of site visits over a long period of time. Short-term interest, another type of user classification model 206 output may include topics that are of interest for a short period of time. Related to short-term interests are often purchase interests. Depending on queries in the query log and site visits, the user 204 may be classified as interested in or, in some implementations, likely to purchase a good or service. The type of good or service likely to be purchased may be part of a taxonomy of goods and services in a list maintained by the attention application 202. Another way to determine purchase interests may be search of purchase history for similar purchases or related purchases.

Another type of output from the user classification model 206 is an estimated demographic of the user 204. The estimated demographic may be based on a number of different factors. Search content may reveal a likely home location of the user 204 (e.g., from maps queries) and query log and content may contain terms associated with certain demographic groups.

The attention application 202 includes an ad matcher 208. The ad matcher 208 combines the locally-determined user classification outputs from the user classification model 206 with an ad catalog received from an advertiser (or aggregated from a set of advertisers) to produce ad hits. The ad hits may be ads in the ad catalog associated with user classification taxonomy entries that match or are related to the locally determined user classification outputs of the user classification model 206. In some implementations, the ad hits are passed to a user interruption model 210 that determines an optimal time to display the ads to the user 204. The user interruption model 210 may include machine learning to determine when the user 204 is more receptive to certain types of ads over others (e.g., based on user activity, at a time when a user has completed one activity and is ready to change to another, etc.).

FIG. 3 is a diagram 300 of attention application privacy settings for user classification and ad matching on an attention application 302. The attention application 302 places control of whether private user information may be used as inputs to the classification model. A user of the attention application 302 selects inputs to the classification model in a classification model control panel 304. In the example illustrated in FIG. 3, the classification model control panel includes check boxes to allow or disallow use of the query log, site visit history, searching of media content consumed by the user at the attention application, application of the user's activity mode (e.g., commuting, on a work break, relaxing at home, consuming media on more than one attention application at the same time, involved in a high attention activity, etc.). In some implementations, a check box includes exceptions to the category, such as sensitive query log terms or site visits that will not be used as an input to the classification engine.

The attention application 302 also includes user control over ad matching against the user classification model. In one implementation, the user may select to only view ads that are associated with a digital asset reward payment. The digital asset reward may be paid by an advertiser or attention consumer. In the example illustrated in FIG. 3, a user of the attention application 302 has selected in the advertiser selection control panel 306 to only view ads that pay over 0.1 attention tokens.

The attention application 302 includes an exclusion control panel 310 for excluding ads from certain advertisers. Since user classification and ad matching occurs on the attention application 302 itself, the attention application 302 can decline to match ads from any advertisers selected by the user.

Figure 4:
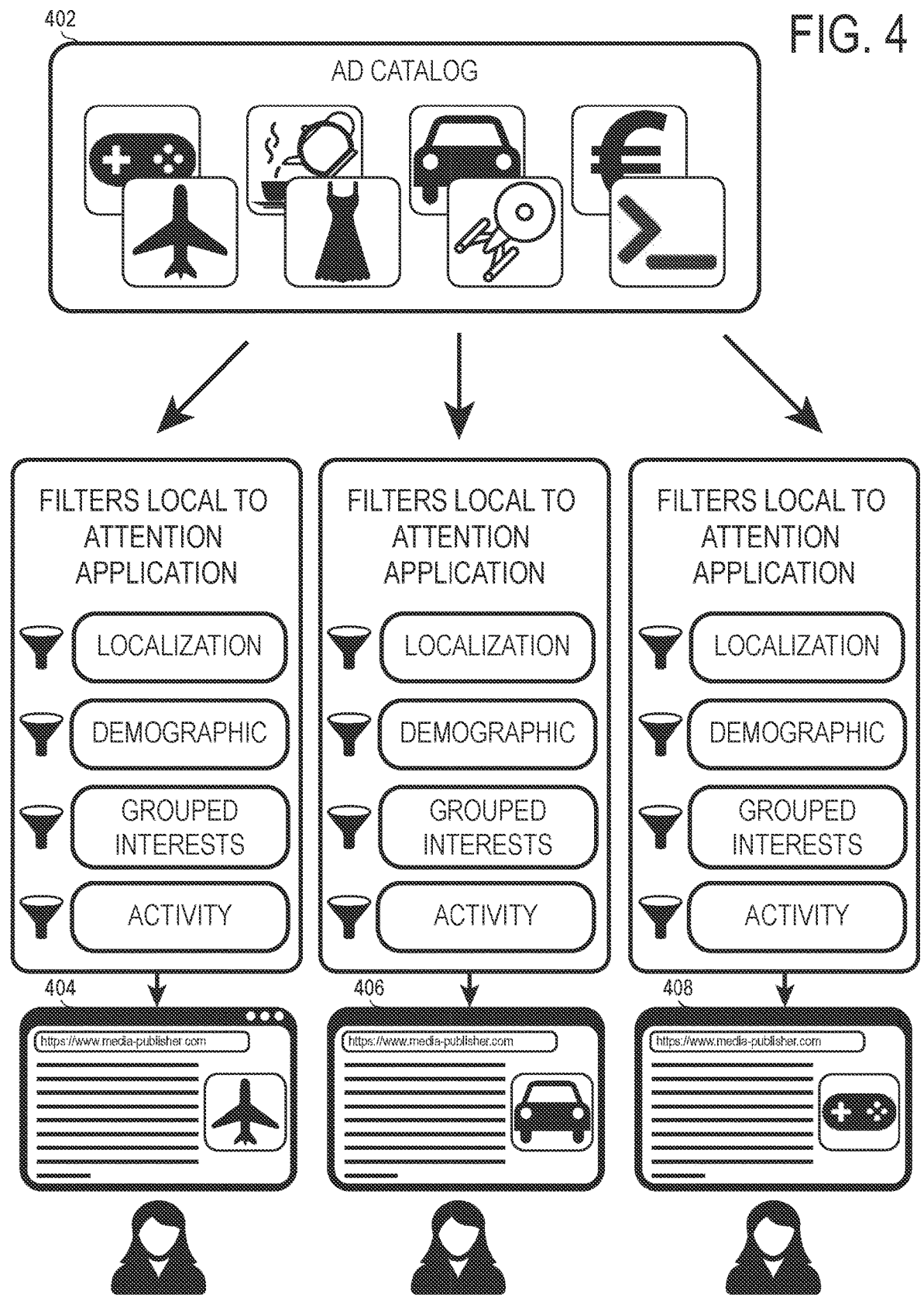
FIG. 4 is a block diagram of an attention applications applying classification filters to an ad catalog.

FIG. 4 is a block diagram of an attention applications 404, 406, and 408 applying classification filters to an ad catalog 402. The ad catalog 402 includes a variety of ads that advertisers wish to display to a wide range of target markets. Since user classification and ad matching is performed on the attention application and not in the cloud, the advertisers do not know which target market the user of a particular attention application belongs to. Instead, an entire catalog of ads 402 is bundled and sent to the attention applications.

In some implementations, all users receive the same catalog of ads 402. In other implementations, there could be an optimization of the catalog 402 to at least some extent based on information known regarding the respective attention applications. Although it may be desirable from a privacy perspective to have a unified catalog wherein all users receive the same catalog without any matching done against the user at all, there are some considerations that could lead to multiple optimized versions of the ad catalog. For example, if the catalog grows too large to be manageable, catalogs could be broken out by language or region such that users can select a catalog likely to contain more relevant ads. Other considerations include whether Intellectual Property rights (e.g., copyright, etc.) could be infringed in only certain geographies and thus ad catalogs pertaining to those geographies could delete a potentially problematic ad. Other potential optimizations include a version of the ad catalog directed to a user's platform (e.g., Apple's OS X, linux, Microsoft Windows, etc). In general, it is preferable for the ad catalogs not to be customized and for distribution of the catalogs to follow privacy-protecting practices such as downloads from endpoints that do not track IP addresses and/or decentralization of the means of download across multiple parties such that no single party can track metadata of the users according to their ad catalog downloading practices.

When the ad catalog 402 is passed to the respective attention applications, the attention applications apply a series of filters to narrow the set of ads against which the classification model may be matched. Ads in the catalog 402 may be organized according to a taxonomy wherein each ad is associated with a target market. The ads in the catalog 402 may also have tags associating them with localized areas, demographics, grouped interests, activities, and more. As the ads pass through the filters, the set of available ads narrows until a single ad is displayed to a user on the respective attention applications. In the example illustrated in FIG. 4, the same ad catalog 402 is sent to the respective attention applications 404, 406, and 408, and a different ad is displayed to the user of each attention application.

In implementations, the only type of ads allowed into the ad catalog are "privacy preserving ads." Privacy preserving ads have features that safeguard the privacy of the user of the attention application and often also improve performance due to faster content loading times. A privacy preserving ad prevents access to any personally identifiable information (e.g., the user's real name, address, email, payments and/or purchase history, browser query log, browser history, contact list, which ads have been viewed, which advertising market segments the user has been classified in, previously used cryptocurrency wallet addresses, credit card numbers, any information protected under the EU General Data Protection Regulation, etc.).

Another type of user information that is not necessarily personally identifiable but that still relates to the user and can be used to fingerprint the user for tracking around the Web is user data. User data is data connected to the user including IP address, persistent identifiers associated with a user, etc. A privacy preserving ads exposes as little user data as possible and ideally none. Privacy preserving ads do not have persistent user identifiers, no third-party tracking, and no storage of third party data on the browser.

Figure 5:
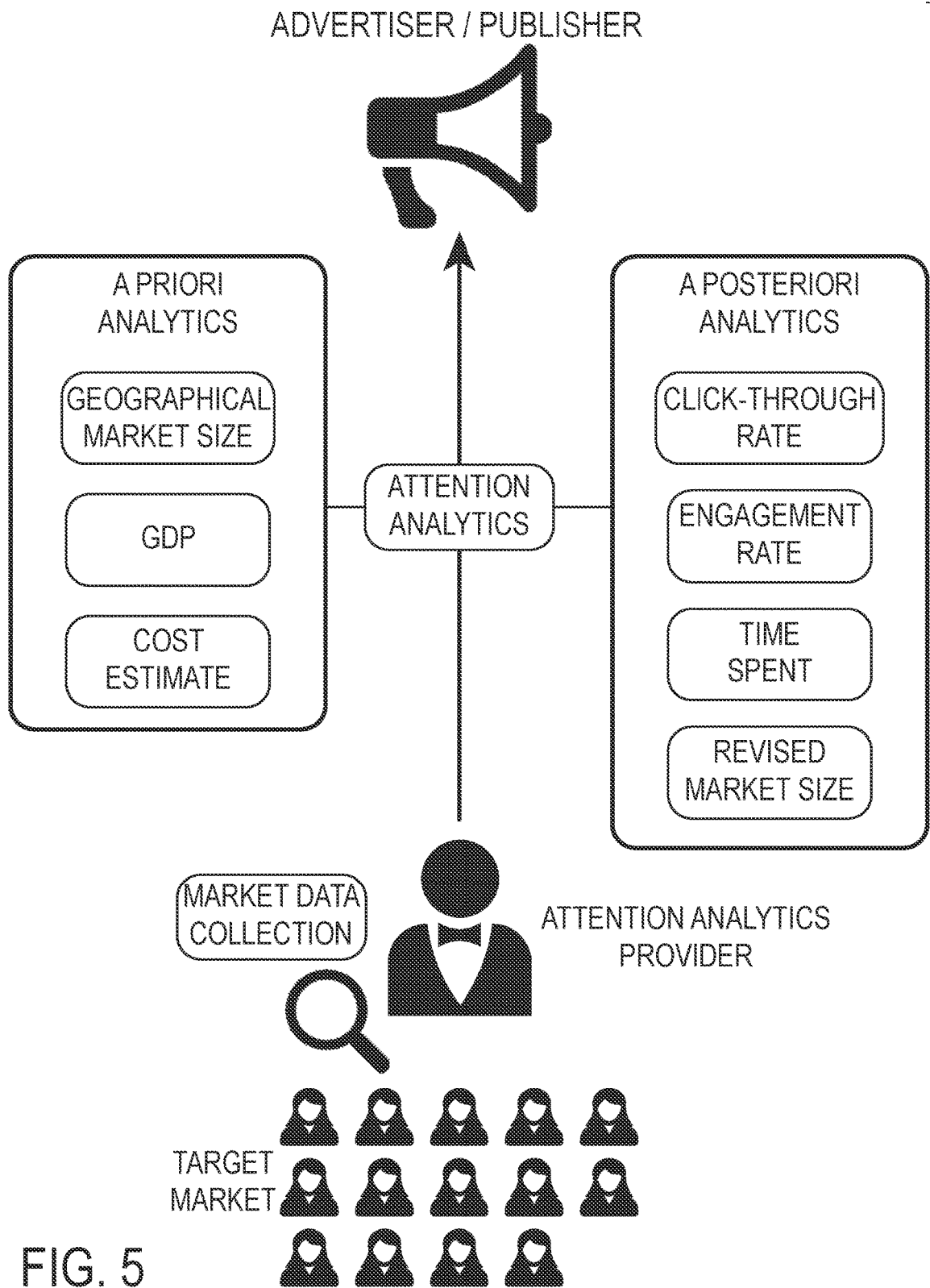
FIG. 5 is a block diagram on an attention analytics provider analyzing a target market to provide attention analytics to an analytics consumer.

FIG. 5 is a block diagram 500 of an attention analytics provider analyzing a target market to provide attention analytics to an analytics consumer. An analytics consumer, such as an advertiser, may not have as much visibility into the success of an ad campaign if the classification and matching occurs on an attention application instead of in the cloud. If the analytics consumer cannot follow the users with trackers, it may not be able to know whether its ads are being shown to the target market. An attention analytics provider can analyze the target market and provide or sell attention analytics to the analytics consumer. In some implementations, the attention analytics provider is trusted by members of the target market, and can obtain and anonymize attention metrics and analytics from the target market that are not available to the analytics consumer.

The attention analytics provider may provide a priori analytics to the analytics consumer based on information revealed by members of the target market. Member of the target market may reveal information from sources such as HTTP header fields revealing time zone, localization settings, language settings, etc. Members of the target market may reveal their location due to the times of day they make their requests. For example, if a member of the target market makes content requests during business hours, it may be inferred that the member of the target market is likely an office worker.

Another type of analytics provided by the attention analytics provider are a posteriori analytics that are refined analytics based on an ad campaign. In some cases, the success of an ad campaign may be inferred from visits to the advertiser's website or increasing product sales. In other cases, direct attention metrics may be obtainable, such as if they are shared by members of the target market with the attention analytics provider.

Figure 6:
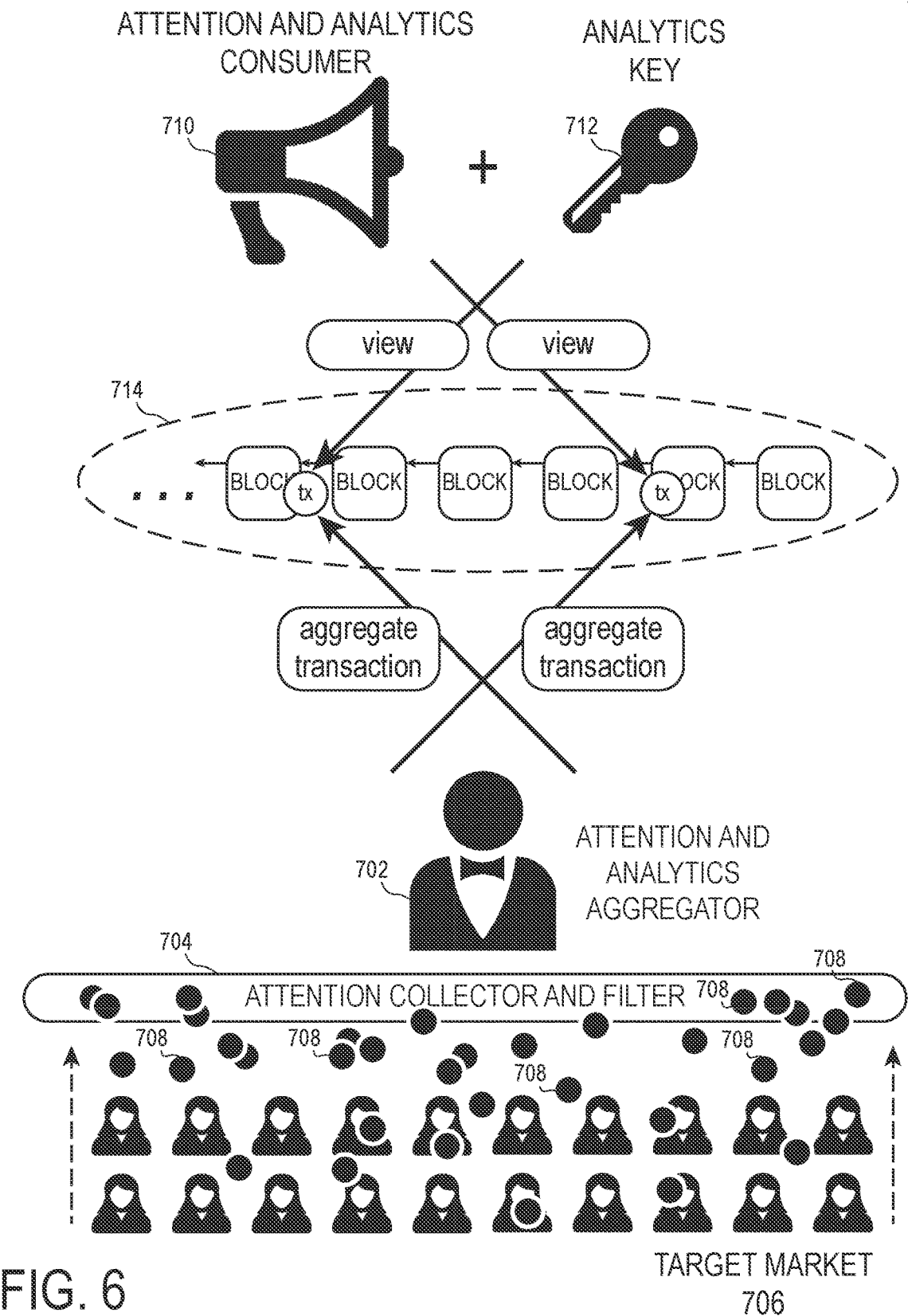
FIG. 6 is a block diagram of an attention and analytics aggregator collecting and interpreting attention metrics and committing aggregate attention analytics to a shared ledger.

FIG. 6 is a block diagram 600 of an attention and analytics aggregator 602 collecting and interpreting attention metrics 608 and committing aggregate attention analytics to a shared ledger 614. An attention and analytics consumer (e.g, an advertiser, publisher, etc.) may not have visibility into the success of an ad campaign in the absence of trackers and where user classification and ad matching is performed against an ad catalog locally at an attention application at the edge of the network instead of at the cloud where it is more visible to the attention and analytics consumer 610.

In the example system 600, an attention and analytics aggregator includes an attention collector and filter 604 for receiving and collecting attention metrics from a target market 606. In one implementation, the attention and analytics aggregator 602 has permissions to view attention metrics from users in the target market 606. Rather than revealing all the attention metrics 606 to an attention and analytics consumer 610, the attention and analytics aggregator 602 may provide aggregate analytics on the target market 606.

In one implementation, the attention and analytics aggregator broadcasts aggregate transactions to the network of a shared ledger 614 to preserve an immutable record of the attention. An attention and analytics consumer 610 may access the aggregate transactions on the shared ledger such as with a key 612 purchased from the attention and analytics aggregator.

Figure 7:
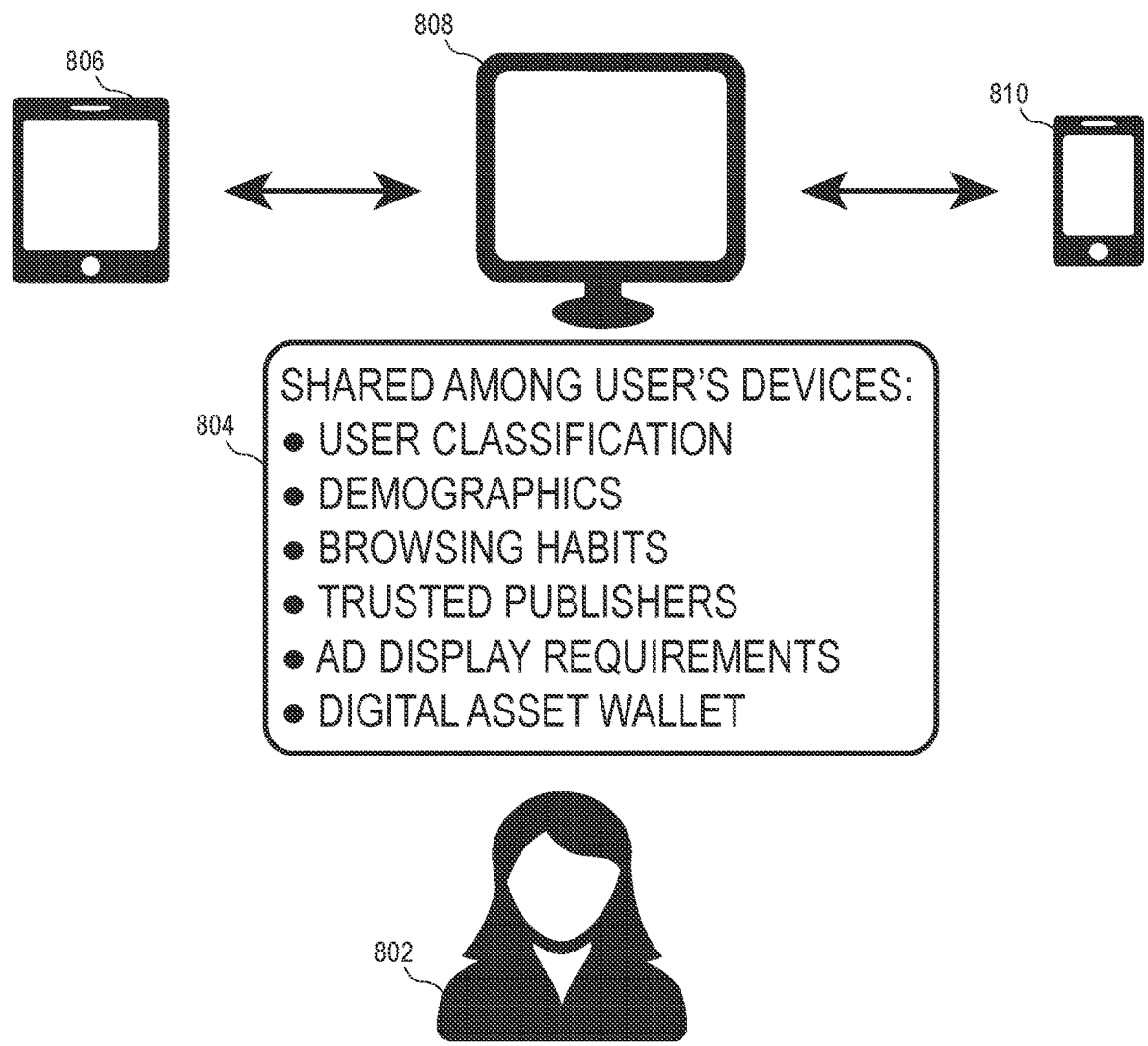
FIG. 7 is a diagram of sharing a classification model of a user across multiple user devices running attention applications.

FIG. 7 is a diagram 700 of sharing a user classification and associated attention features 704 across multiple user devices 706, 708, and 710 running attention applications. Users of attention applications usually have more than one type of attention application (e.g., e-reader, web browser, etc.) running on multiple devices. As disclosed herein, attention applications can share a user classification and associated attention features 704 across the devices. Browsing habits, for example, may vary between the devices 706, 708, and 710, especially based on activity. A user classification shared across devices can match ads depending on the type of activity in which the user is engaged (e.g., showing detailed text ads if the user is reading news during a commute, etc.).

Another feature that can be shared among several devices is a digital asset wallet. In some implementations, attention consumers may reward attention by paying the user 702 in a digital asset. The user 702 may spend the digital asset with content publishers, for example to provide an alternative to intrusive ads or paywalls. As the user moves among devices 706, 708, and 710, the digital asset wallet may be shared such that digital assets acquired or earned on one device may be spent on another.

Figure 8:
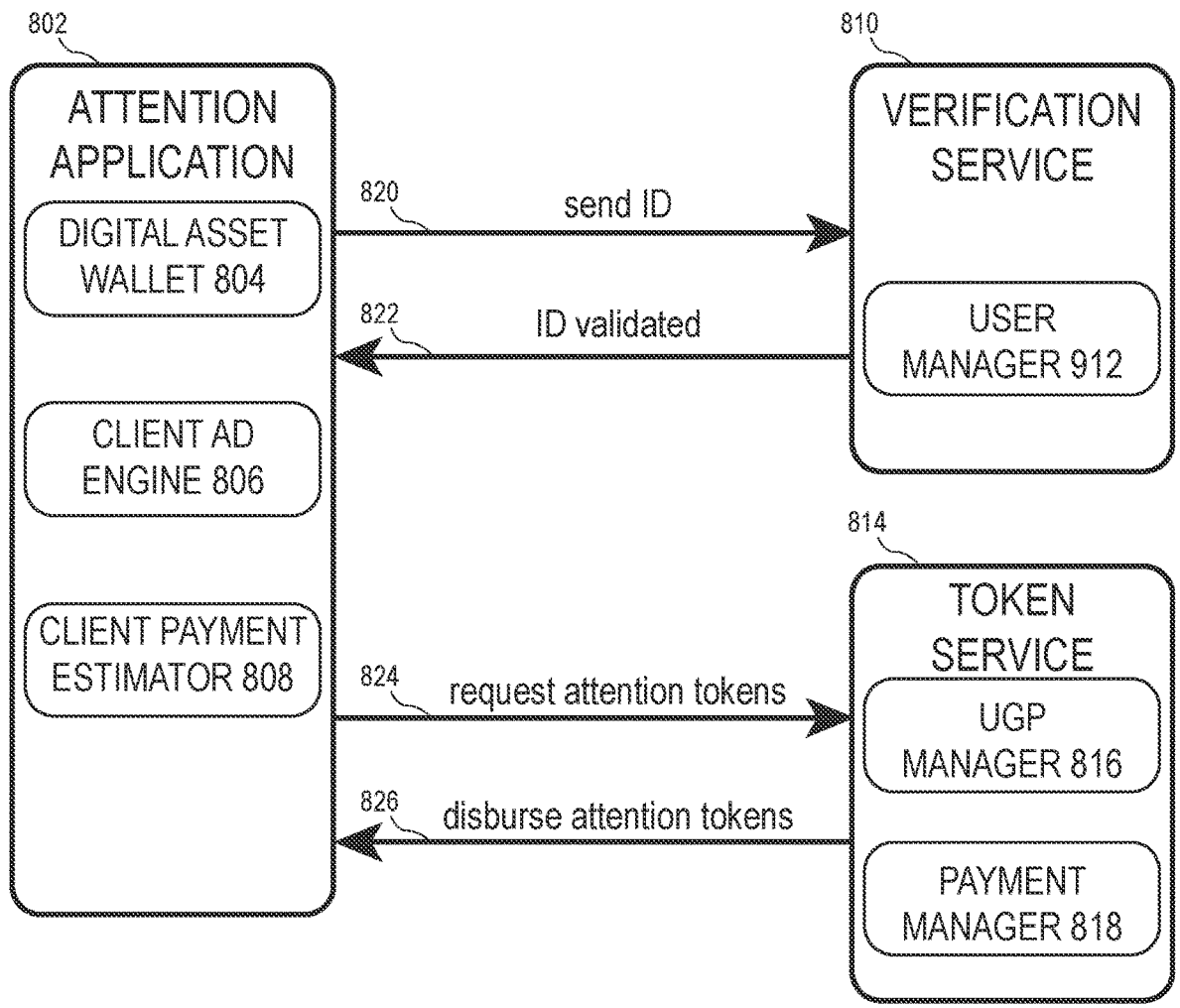
FIG. 8 is a diagram of a relationship among an attention application, a verification service, and a token service for registering the attention application with the system and disbursing attention tokens thereto.

FIG. 8 is a diagram of a relationship 800 among an attention application 802, a verification service 810, and a token service 814 for registering the attention application 802 with the system and disbursing attention tokens thereto.

In one implementation, the attention application 802 verifies itself with the verification service 810 by sending an identifier in step 820. The identifier, however, is not an identifier of the user, but rather an identifier of the attention application 802 itself. If the digital asset wallet 804 is based on a recovery seed written down or stored offline by the user of the attention application 802, then the user can deterministically create the same set of keys on any attention application based on the recovery seed. One type of ID created is a public key (e.g., a blockchain payment address). The attention application 802 can use the public key of the digital asset wallet 804 to do various things in the system 800 including receive and spend digital asset funds, sign a message proving ownership of private keys associated with the public key, distinguish itself from other attention applications due to the uniqueness of the key. A practical public key system is likely to have an address space large enough that there are no collisions between public keys, no matter how many attention applications 802 exist.

An important feature of using a public key to "ID" the attention application 802 is that the public key is not linked to personally identifiable information of the user (e.g., the user's real name, address, email, payments and/or purchase history, browser query log, browser history, contact list, which ads have been viewed, which advertising market segments the user has been classified in, previously used cryptocurrency wallet addresses, credit card numbers, any information protected under the EU General Data Protection Regulation, etc.). If a public key ever actually is linked to the user's personally identifiable information (e.g., by disclosure of the pubkey by the user to a third party who leaks it), then the user can create new pubkeys at practically no cost any time, which would not be so linked. The pubkey thus enables the functions described herein while enhancing privacy of the user compared to other systems of "ID" that are linked to personally identifiable information or that are harder to change (e.g., an email address).

Another role of the digital asset wallet 804 is to hold and spend digital assets such as attention tokens. The digital assets may be held directly in the digital asset wallet 804 such that spending operations are handled locally by signing payment transactions with a private key associated with the public key of the digital asset wallet 806. In other implementations, the attention tokens may themselves be held by a third-party payment processor on behalf of the attention application 802 and spending operations are handled by the attention application signing a message with the private cryptographic key associated with the public payment address of the digital asset wallet 806. The signed message, upon receipt by the third-party payment processor could be relied on to spend digital assets on behalf of the attention application 802.

FIG. 8 also illustrates a workflow between the attention application 802 and the verification service 810. At operation 920, the attention application 902 sends an ID to the attention server 804. The attention ID may be a public key (or payment address) of the digital asset wallet 806. Operation 820 may include signing of a message by the digital asset wallet 806 with a private key associated with the ID to prove ownership, such that other attention applications may not spoof the ID. The user manager 812 may add the pubkey of the attention application 802 to a list of active attention applications if the ID is valid (e.g., if the pubkey is a valid payment address on a blockchain on which digital assets are transmitted). A validation operation 822 may inform the client of the acceptance of the ID.

Another function of the digital asset wallet 804 is to request attention tokens from the token service 814. A requesting operation 824 can request attention tokens from the payment manager 918. In some implementations of the system 800, there is a User Growth Pool (UGP) of attention tokens from which grants may be made to individual attention applications. The UGP grant tokens may be restricted (e.g., they may be non-transferable from the digital asset wallet 806). One way of restricting UGP tokens is for the payment manager 818 not to actually transfer UGP tokens to the digital asset wallet 806, as digital assets are normally transferred (e.g., broadcasting a transaction to a network of a blockchain to update a shared ledger to move a token balance from the sender to the recipient). Instead, the attention server 814 or another system can continue to hold a private key with spending ability of the tokens and simply record an assignment of the tokens to the attention application 802. Later, tokens so stored can be transferred again to a media content creator. An advantage of avoiding a confirmed blockchain transaction is increased speed and lower cost (e.g., not necessary to pay blockchain transaction fees or burn gas to transfer a token, the cost of which may be unpredictable and potentially high) at the expense of introducing a centralized component to the system. A restore seed may be used to generate one or more payment addresses and to sign messages on the digital asset wallet 906 whether attention tokens are stored therein or not. If the request operation 824 is successful, a disbursing operation 826 can transfer attention tokens (on-chain or off) to the digital asset wallet 804.

Figure 9:
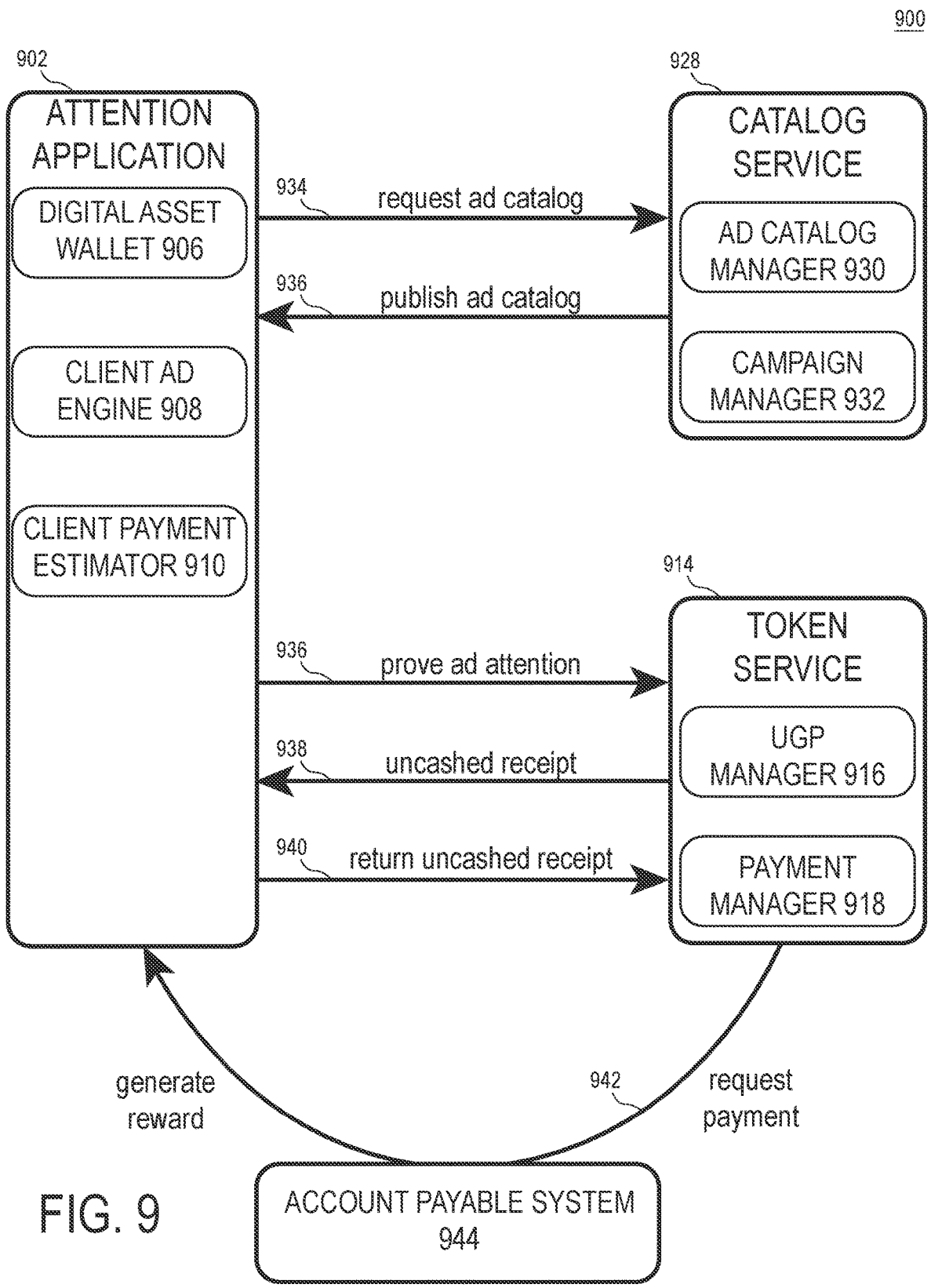
FIG. 9 is a diagram of a relationship among an attention the application, the token service, and two other components of the system, a catalog service and an account payable system.

FIG. 9 is a diagram of a relationship 900 among an attention the application 902, the token service 914, and two other components of the system, a catalog service 928 and an account payable system 944. The catalog service 928 distributes ad catalogs to the attention application 902 and its client ad engine 908 for display to a user of the attention application 902. The accounts payable system is involved in granting and redemption of attention tokens.

In an implementation described herein, advertisers do not publish ads directly to the attention application 902. Instead, ad catalogs including many advertisements from many advertisers are aggregated for the attention application 902 by the catalog service 928 and transmitted as a unified catalog and/or an update to a catalog to the attention application 902. As ads from the ad catalog are shown to the user of the attention application 902 by the client ad engine 908, the attention application 902 may collect proofs or indicia or attention regarding displayed ads, and manage digital asset reward payments including rewards to content creators (e.g., autopayments based on fraction of total attention, one-time tip payments, recurring tip payments, etc.) and rewards to the user of the attention application (e.g., grants from a user growth pool, reward payments for attention to ads in the catalog, etc.).

If an ad catalog is optimized to reduce file size, the optimization may be based on the factors described herein (e.g., localization, user platform, etc.). Ads may also be chosen for inclusion in an optimized ad catalog based on association with a digital asset reward (e.g., the attention application will receive ads associated with rewards above a threshold). A campaign manager 918 handles inclusion of ads in catalogs according to requests from advertisers (e.g., including ads above rewards thresholds).

An operation 936 may prove attention paid to media content and/or ads at the attention application 902, such as with a blinded token. Upon validation of the operation 936, the attention server 904 may send uncashed receipts to the attention application 902 at operation 938 for attention tokens according to attention proven to ads in the catalog. Proving the attention to media content may be done via a Zero-Knowledge proof confirmation. A client can create the zero-knowledge proof by creating a pool of blinded tokens and only unblinding the tokens after they have been confirmed by an ad server to include a key that was present in the ad catalog. Proving attention via a zero-knowledge proof may be done as described in U.S. patent application Ser. No. 16/435,808, entitled, "Attention Metrics for Attention Applications," filed Jun. 10, 2019, which is incorporated by reference herein in its entirety.

The attention application 902 may accumulate uncashed receipts until a returning operation 940 returns receipts to the attention server 904. The token service 914 may respond with a payment request 942 to generate the digital asset reward to the digital asset wallet 906 of the attention application. As with the UGP grant tokens, the generated reward may include a confirmed blockchain transaction to transfer attention tokens to the digital asset wallet 906 and/or it may include assigning tokens off-chain to the digital asset wallet 906 at a third-party payment processor (e.g., the accounts payable system 944).

A client payment estimator 910 on the attention application 902 may track uncashed receipts and provide means to the user to estimate digital assets available (e.g., including U.S. Dollar or other currency equivalent value) and to form and submit the return of uncashed receipts 940 and/or initiation of the payment request 942. Estimation of reward payments may be based on a number of factors. Some ads in the catalog may include an attention threshold to be met before qualifying for a reward payment. Ads in the catalog may pay rewards according to the amount of total attention paid to the ad. The quality of the attention may be a factor in determining rewards payments (e.g., scrolling past an ad may be given lower weight than indicia of interaction with an ad such as clicking on the ad to navigate to another page, evidence of user reading the ad, etc.).

Figure 10:
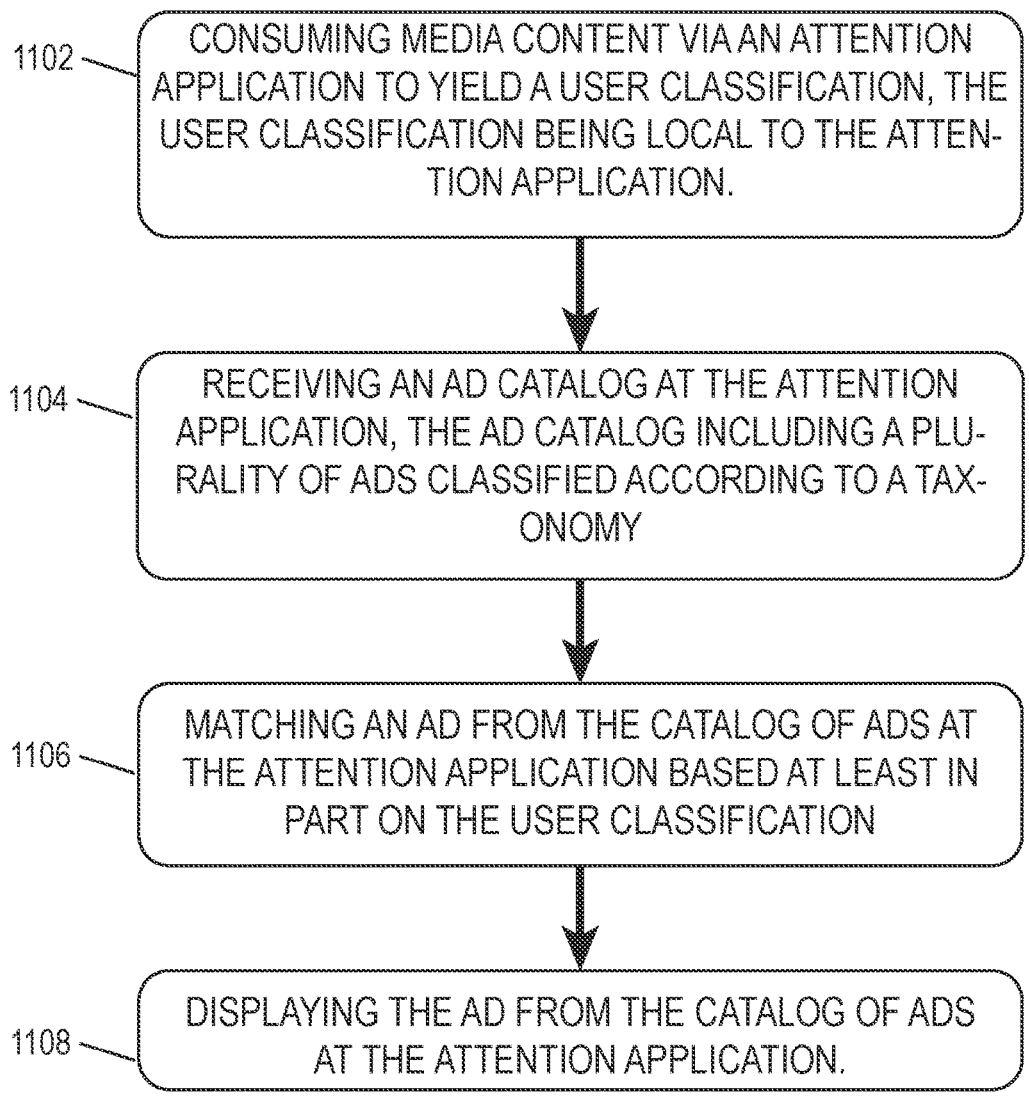
FIG. 10 is a flowchart of a method of attention application privacy user classification.

FIG. 10 is a flowchart of a method 1000 of privacy user classification. A consuming operation 1002 consumes media content via an attention application to yield a user classification, the user classification being local to the attention application. In contrast to user classifications made in the cloud, such as by advertisers and/or trackers, the user classification of the consuming operation 1002 is not shared outside the attention application. A user of the attention application may control which aspects of the consumption of media are available to yield the user classification (e.g., query log, site visit history, page dwell time, text highlighting, reading speed, next page queries, etc.). In one implementation, the user classification is according to a commercial taxonomy wherein the user is classified according to types of interests (long-term interests, short-term interests), likelihood of purchase of goods and/or services in the taxonomy (interested buyer, likely buyer), demographic, location, etc.

A receiving operation 1004 receives an ad catalog at the at the attention application, the ad catalog including one or more ads classified according to a taxonomy. Each ad in the catalog may be associated with more than one category in the taxonomy. The ads in the catalog may be associated with a reward to a user of the attention application (e.g., in a digital asset) for spending attention with respect to the ad. The ads in the catalog may be limited in terms of their behavior (e.g., abusive behavior such as full screen, autoplay audio, click screens, etc. may be disallowed). The ad catalog can be optimized to reduce file size, but privacy will be improved the more users receive the same ad catalog because individual user targeting will be diminished.

A matching operation 1006 matches an ad from the catalog of ads at the attention application based at least in part on the user classification. Ads in the catalog may be prioritized according to several factors such as closeness of a match to the user classification (e.g., likelihood the user of the attention application will be interested in seeing the ad), amount of a reward payment to the user for spending attention on the ad (e.g., higher paying ads are more likely to be shown). The matching operation 1006 may be based on user preferences (e.g., show highest paying ads first, regardless of match). Ads in the catalog may specify a minimum level of match with the user classification before the user may spend attention on the ad and receive the attention reward. A displaying operation 1008 displays the ad from the catalog of ads at the attention application.

Figure 11:
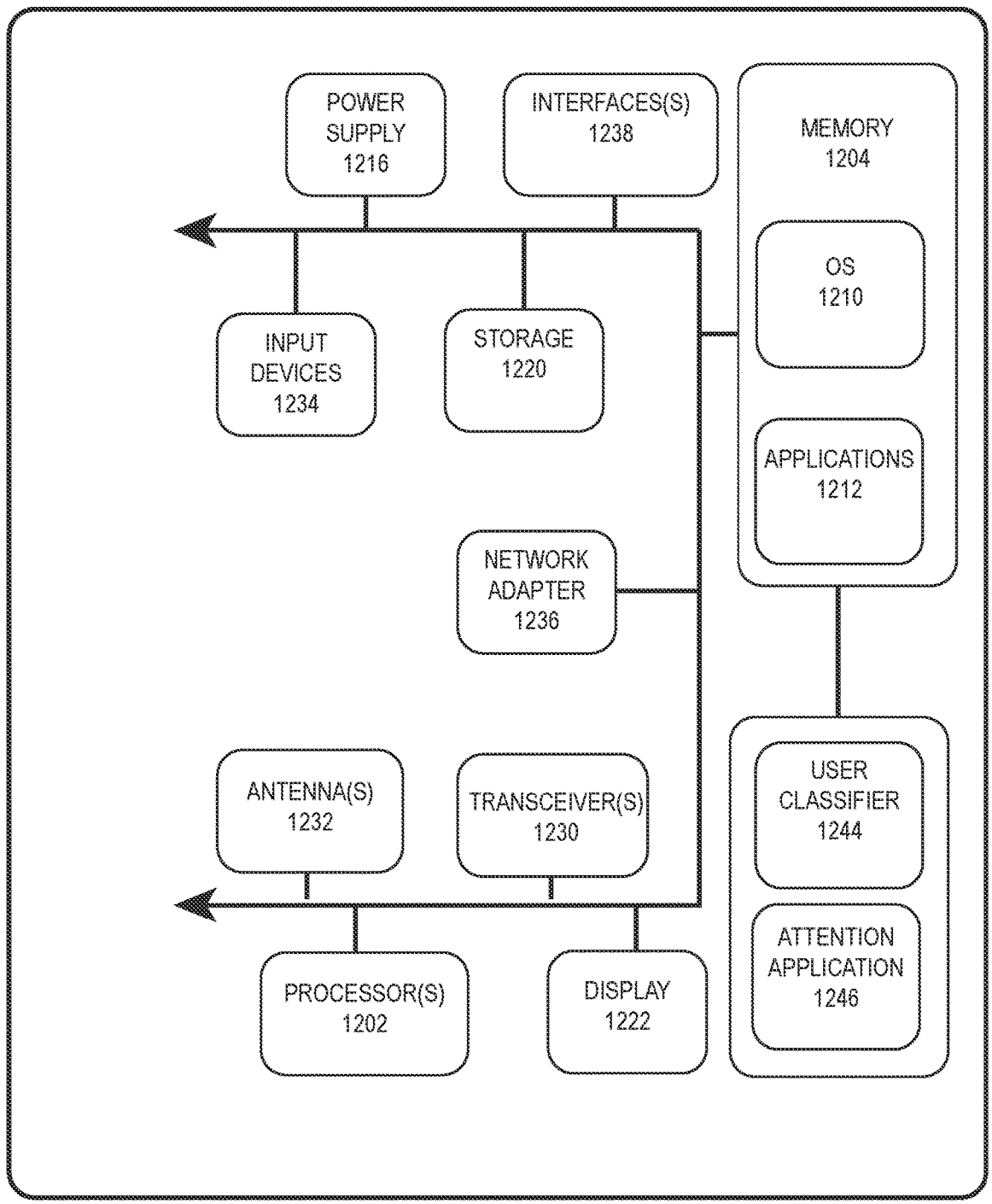
FIG. 11 is a system diagram of a device that may be useful in implementing the disclosure here.

FIG. 11 is a diagram of a system that may be useful in privacy attention application user classification. FIG. 11 illustrates an example system (labeled as a processing system 1100) that may be useful in implementing the described technology. The processing system 1100 may be a client device, such as a smart device, connected device, Internet of Things (IoT) device, laptop, mobile device, desktop, tablet, or a server/cloud device. The processing system 1100 includes one or more processor(s) 1102, and a memory 1104. The memory 1104 generally includes both volatile memory (e.g., RAM) and non-volatile memory (e.g., flash memory). An operating system 1110 resided in the memory 1104 and is executed by the processor 1102.

One or more application programs 1112 modules or segments, such as an privacy user classifier 1144 and attention application 1146 are loaded in the memory 1104 and/or storage 1120 and executed by the processor 1102. In some implementations, the oracle manager 1144 is stored in read-only memory (ROM) 1114 or write once, read many (WORM) memory. Data such as extrinsic event data sources may be stored in the memory 1104 or storage 1120 and may be retrievable by the processor 1102 for use by oracle manager 1144 and the blockchain manager 1146, etc. The storage 1120 may be local to the processing system 1100 or may be remote and communicatively connected to the processing system 1100 and may include another server. The storage 1120 may store resources that are requestable by client devices (not shown). The storage 1120 may include secure storage such as one or more platform configuration registers (PCR) managed by one or more trusted platform modules (TPMs), which may be implemented in a chip or by the trusted execution environment (TEE).

The processing system 1100 includes a power supply 1116, which is powered by one or more batteries or other power sources and which provides power to other components of the processing system 1100. The power supply 1116 may also be connected to an external power source that overrides or recharges the built-in batteries or other power sources.

The processing system 1100 may include one or more communication transceivers 1130 which may be connected to one or more antenna(s) 1132 to provide network connectivity (e.g., mobile phone network, Wi-Fi®, Bluetooth®, etc.) to one or more other servers and/or client devices (e.g., mobile devices, desktop computers, or laptop computers). The processing system 1100 may further include a network adapter 1136, which is a type of communication device. The processing system 1100 may use the network adapter 1136 and any other types of communication devices for establishing connections over a wide-area network (WAN) or local area network (LAN). It should be appreciated that the network connections shown are exemplary and that other communications devices and means for establishing a communications link between the processing system 1100 and other devices may be used.

The processing system 1100 may include one or more input devices 1134 such that a user may enter commands and information (e.g., a keyboard or mouse). Input devices 1134 may further include other types of input such as multimodal input, speech input, graffiti input, motion detection, facial recognition, physical fingerprinting, etc. These and other input devices may be coupled to the server by one or more interfaces 1138 such as a serial port interface, parallel port, universal serial bus (USB), etc. The processing system 1100 may further include a display 1122 such as a touch screen display.

The processing system 1100 may include a variety of tangible processor-readable storage media and intangible processor-readable communication signals including in virtual and/or cloud computing environment. Tangible processor-readable storage can be embodied by any available media that can be accessed by the processing system 1100 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 1600. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. An attention application advertisement delivery system, the system comprising:
   a device that includes at least one hardware device processor; and
   a computer readable storage medium storing instructions for execution by the at least one hardware device processor, the instructions, when executed, causing one or more of the at least one hardware device processor to:
      receive, from an analytics consumer based at least in part on ads of an ad catalog being serviced to users of a target market via an attention application that locally performs ad matching and user classification, a request for attention analytics on the target market, wherein each ad of the ad catalog hides, from the analytics consumer, respective identities of the users that view the ads on respective attention applications;

receive, from one or more attention applications associated with the users of the target market and via a zero-knowledge proof that hides an attention metric input for a particular user, attention analytics associated with respective users associated with one or more attention applications, wherein receiving the attention analytics via the zero-knowledge proof comprises:

receiving a blinded token from a pool of blinded tokens, wherein the blinded token includes a cryptographic key present in the ad catalog; and wherein the attention metric input hidden by the zero-knowledge proof is indicative of attention paid, by the particular user, to ads matched and serviced locally by the attention application;

determine, using the attention analytics received via the zero-knowledge proof, attention analytics of the target market with respect to at least one ad in the ad catalog; and transmit the attention analytics of the target market via a shared ledger, wherein the attention analytics of the target market are accessible by the analytics consumer via the shared ledger using an analytics key.

2. The system of claim 1, wherein the analytics consumer pays users of the attention applications a digital asset for attention paid to the at least one ad in the ad catalog.

3. The system of claim 1, further comprising:

determining a success metric of the at least one ad in the ad catalog, the success metric being based at least in part on an amount of a digital asset paid per attention unit to the at least one ad in the ad catalog.

4. The system of claim 3, wherein the success metric is further based at least in part on a size of the target market.

* * * * *